US010452328B2

United States Patent
Olds et al.

(10) Patent No.: US 10,452,328 B2
(45) Date of Patent: Oct. 22, 2019

(54) EXTENSIBLE TOKEN-BASED AUTHORIZATION

(71) Applicant: VMware, Inc., Palo Alto, CA (US)

(72) Inventors: Dale Olds, Redwood City, CA (US); Fanny Strudel, Sunnyvale, CA (US); Brad Neighbors, Boston, MA (US)

(73) Assignee: VMWARE, INC., Palo Alto, CA (US)

( * ) Notice: Subject to any disclaimer, the term of this patent is extended or adjusted under 35 U.S.C. 154(b) by 254 days.

(21) Appl. No.: 15/252,638

(22) Filed: Aug. 31, 2016

(65) Prior Publication Data

US 2018/0060595 A1    Mar. 1, 2018

(51) Int. Cl.
| H04L 29/06 | (2006.01) |
| G06F 3/12 | (2006.01) |
| G06F 21/41 | (2013.01) |
| G06Q 10/06 | (2012.01) |

(52) U.S. Cl.
CPC .......... *G06F 3/1274* (2013.01); *G06F 3/1222* (2013.01); *G06F 3/1238* (2013.01); *G06F 3/1285* (2013.01); *G06F 21/41* (2013.01); *G06Q 10/06* (2013.01); *H04L 63/0815* (2013.01); *G06F 3/1239* (2013.01)

(58) Field of Classification Search
CPC .... G06F 3/1274; G06F 3/1239; G06F 3/1229; G06F 3/1222; G06F 3/1238; G06F 21/41; H04L 63/083; H04L 63/08–0892; H04L 63/10–108
See application file for complete search history.

(56) References Cited

U.S. PATENT DOCUMENTS

| 8,893,268 | B2* | 11/2014 | Felt | H04L 63/10 719/313 |
| 2003/0079136 | A1* | 4/2003 | Ericta | H04L 63/101 713/185 |
| 2012/0117626 | A1* | 5/2012 | Yates | H04L 9/3213 726/4 |
| 2012/0233668 | A1* | 9/2012 | Leafe | G06F 9/44526 726/4 |
| 2013/0074158 | A1* | 3/2013 | Koskimies | H04L 63/0428 726/4 |
| 2014/0007198 | A1* | 1/2014 | Durbha | H04L 63/102 726/4 |
| 2014/0020064 | A1* | 1/2014 | Hildebrand | G06F 21/335 726/4 |
| 2015/0200948 | A1* | 7/2015 | Cairns | G06F 21/44 726/4 |
| 2016/0105420 | A1* | 4/2016 | Engan | H04L 9/3228 455/411 |
| 2016/0164851 | A1* | 6/2016 | Borovoy | G06F 21/44 726/1 |

* cited by examiner

*Primary Examiner* — Matthew T Henning

(57) ABSTRACT

A system and method for granting a user access to one or more resources managed by one or more resource servers may include authenticating a user of an application. An application scope associated with the application may represent resource server(s) and respective resources that the application is configured to access or otherwise consume. A management role associated with the user may represent resource server(s) and respective resources that the user is authorized to access or otherwise consume. An access token may be determined using the application scope and the management role. The access token may represent resource server(s) and respective resources that the user is authorized to access or otherwise consume via the application.

20 Claims, 8 Drawing Sheets

A Library Service

Library Resources:

| Resource Type | Attributes | Enforced Service Roles |
|---|---|---|
| book | cover, genre, pages, shelfID, rare | read, checkout, checkin, destroy, review |
| shelf | location, locked | deposit, remove, open |
| returnsBin | location | deposit, remove |

Library Management Roles:

| Name | Resource Sets | Service Roles |
|---|---|---|
| reviewer | service=library, rtype=book, rare=true | read, checkout, review |
| reader | service=library, rtype=book, rare=false | read, checkout |
| novice | service=library, rtype=book, rare=false | read |
| librarian | service=library, rtype=book, rare=true | checking, destroy |
| | service=library, rtype=shelf | deposit, open |
| | service=library, rtype=returnsBin | remove |

Fig. 2

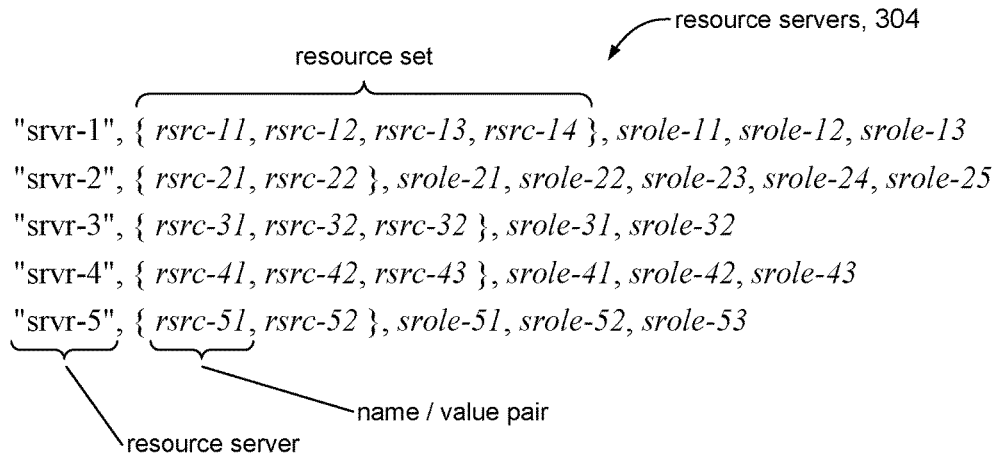
Fig. 3A
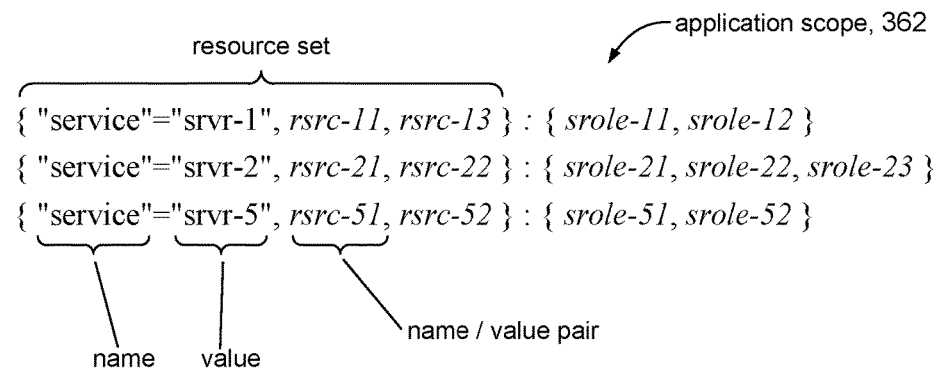
Fig. 3B
Admin-manager : *user=John Smith*   ⟵ management role, 322
{ "service"="srvr-1", *rsrc-11* } : { *srole-12* }
{ "service"="srvr-3", *rsrc-31, rsrc-32* } : { *srole-31, srole-32* }
{ "service"="srvr-4", *rsrc-41, rsrc-42, rsrc-43* } : { *srole-41, srole-42, srole-43* }
Fig. 3C Admin-manager : *user=John Smith* management role 622
- 622a  { "service"="print-service", "queue"="matte" } : { "print" }
- 622b  { "service"="srvr-3", rsrc-31, rsrc-32 } : { srole-31, srole-33 }
- 622c  { "service"="srvr-4", rsrc-41, rsrc-42, rsrc-43 } : { srole-41, srole-42, srole-43 } resource set → "service" role set application scope 662
- 662a  { "service"="print-service", "queue"="matte", "queue"="glossy" } : { "print", "delete print job" }
- 662b  { "service"="srvr-3", rsrc-31, rsrc-32 } : { srole-31, srole-32, srole-33 }
- 662c  { "service"="srvr-5", rsrc-51, rsrc-52 } : { srole-51, srole-52 } resource set → "service" role set access token 624
- 624a  { "service"="print-service", "queue"="matte" } : { "print" }
- 624b  { "service"="srvr-3", rsrc-31, rsrc-32 } : { srole-31, srole-33 } resource set → "service" role set

Fig. 6A

EXTENSIBLE TOKEN-BASED AUTHORIZATION

BACKGROUND

Most modern applications comprise a front end user interface (UI) that may access a series of backend services. The front end may be a native application on a mobile device, a Javascript™ application in a browser, a traditional web application, and so on. The front end may make application programming interface (API) calls to access or otherwise consume resources managed in the various backend services, which may in turn call other services. Access to these resources may require authentication.

Applications may need to make API calls to several services to accomplish work for user. However, each application and service typically makes its own authorization decisions based on user attributes—usually by mapping them to a set of internal roles or permissions that the application and service maintains. This can increase the complexity in systems comprising composite applications consisting of a front end and potentially many backend services, since each component performs its own authentication processing. Some solutions have been proposed to simplify the authentication task. OAuth2, for example, is a standard framework set forth by the Internet Engineering Task Force (IETF) for abstracting authentication away from the application to an authorization service which delivers tokens to the front end UI that can be used for API calls to other services.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 2 shows an illustrative example of resource servers, resources, and management roles in accordance with the present disclosure.

FIGS. 3A-3C illustrate examples of application scope and management roles in accordance with some embodiments of the present disclosure.

FIGS. 6 and 6A illustrate processing to generate an access token in accordance with some embodiments of the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
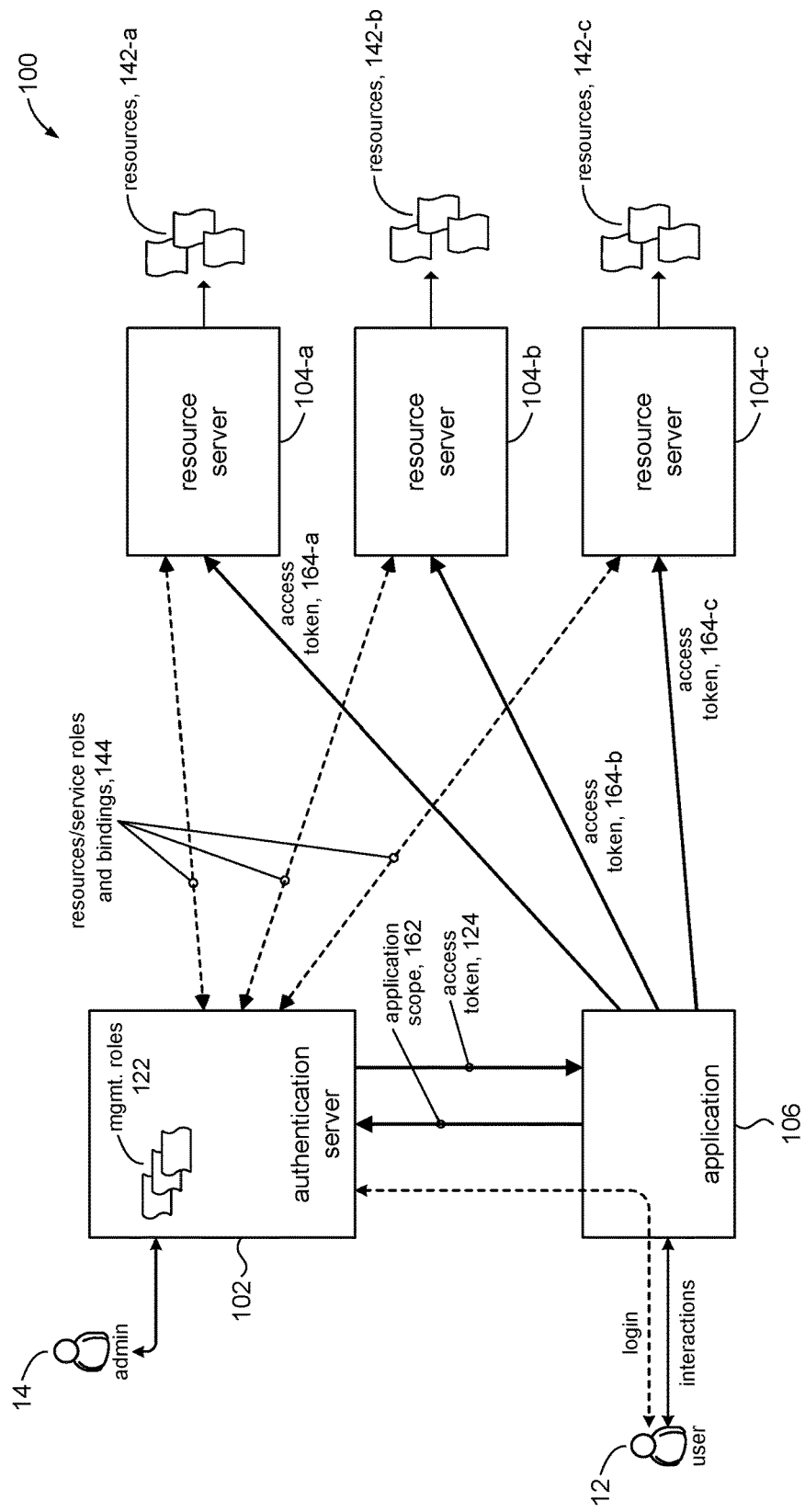
FIG. 1 shows a high level block system for authenticating access to resources in accordance with the present disclosure.

FIG. 1 shows an illustrative embodiment for authorization processing in accordance with the present disclosure. The figure introduces components that comprise a system 100 for providing token-based authorization in accordance with the present disclosure. Further details of the various components are discussed below.

In some embodiments, for example, a system 100 for providing token-based authorization may include an authorization server 102 and one or more resource servers 104-*a*, 104-*b*, 104-*c*. Each resource server 104-*a*, 104-*b*, 104-*c* may host, manage, and provide secured access to one or more respective resources 142-*a*, 142-*b*, 142-*c*. A resource may be information; for example, a user's personal data, credit card information, documents, etc., that can be electronically sent to a user. A resource may be physical objects; for example, a library service may manage books that can be loaned out to users. A resource may be services that a user may consume; for example, a photo printing service may provide services such as printing photographs, printing on various qualities of photographic paper, defining print jobs, deleting print jobs, etc.

In accordance with the present disclosure, a resource server 104 may expose APIs (application programming interfaces, not shown) to allow access to its respective resources 142. The resource server 104 may perform authorization checks in order to permit access to its resources 142. In accordance with the present disclosure, the resource server 104 may define permissions referred to as "service roles," which may be associated with actions authorized to be performed on its resources 142.

In accordance with the present disclosure, the authorization server 102 may administer entities called management roles 122. In some embodiments, for example, an administrator 14 may create and administer management roles 122, for example, using information 144 that may be defined by the resource servers 104. Management roles 122 may bind service roles and resources 142 of a resource server 104 to a user or a group of users. The authorization server 102 may manage and enforce authentication policies of the user relative to the resources 142 being requested using the management roles 122. Service roles and management roles are discussed in more detail below.

The system 100 may include one or more application 106 configured to make requests to access one or more of the resources 142*a*-142*c* on behalf of a user 12. In some embodiments, the application 106 may be a native application on a mobile device, a Javascript™ application in a browser, a traditional web application, and so on. Merely for discussion purposes, for example, the application 106 may be a web server configured to interact with user 12 via web pages. The user 12 may interact with the web server using HTTP requests from a web browser (not shown). As another example, the application 106 may be a back end server for a native front end application. For example, the native front end application may be a mobile application. The user 12 may interact with the back end server using a suitable client-server protocol such as REST (representational state transfer), for example. In other embodiments, the application 106 may be a native application that the user 12 directly interacts with.

In accordance with the present disclosure, the application 106 may provide an application scope 162 to the authentication server 102, for example, at a time when the user 12 interacts with the application 106. The application scope 162 may identify or is otherwise associated with resource servers, resources, and service roles that the application 106 can expose to users who access the application 106. In accordance with the present disclosure, the authorization server 102 may return an access token 124 to the application 106. The access token 124 may identify or is otherwise associated with a set of resource servers, resources, and service roles that the application 106 can expose to a particular user 12. Stated differently, the access token may represent resource servers, resources, and service roles that the user is authorized to access or otherwise consume via the application. These aspects of the present disclosure are discussed in more detail below.

The application 106 may access resource servers 104-a, 104-b, 104-c using respective access tokens 164-a, 164-b, 164-c to access or otherwise consume respective resources 142-a, 142-b, 142-c. In some embodiments, for example, the access tokens 164 may comprise information contained in the access token 124 received from the authorization server 102.

The discussion will now turn to a more detailed description of some of the above-described components for token-based authorization in accordance with the present disclosure. In some embodiments, for example, the resources 142 in a resource server 104 may be represented using name/value pair notation. The 'name' may refer to a type or kind of resource, and the 'value' may represent an instance of the resource. In accordance with the present disclosure, the 'name' and 'value' can be arbitrary strings of text and may be defined within the resource server 104 to represent a resource. Since the resource server 104 is the entity that ultimately enforces access to its resources, the strings need only have meaning to the resource server 104. Although the name/value pairs have meaning to the resource server 104, they may be used by the authentication server 102 and application 106 to identify and access resources 142 of the resource server 104, explained below.

Consider, for example, the library service example defined in FIG. 2. The various resources in the library may include books, shelves for the books, return bins (for returned books), and so on. The resources may be identified by the following name/value pairs: "rtype"="book", "rtype"="shelf", "rtype"="returnBin", where the string "rtype" is a name that simply refers to a resource, and the strings "book", "shelf", and "returnBin" are values that identify specific instances of the resource called "rtype". Instead of aggregating all of the library's resources into one resource type called "rtype", the library may have defined different categories of resources; e.g., "books", "shelving types", "bin types", and so on.

In some embodiments, the resource server 104 itself may be viewed (e.g., by the authentication server 102 or application 106) as a resource. For example, the library service may be identified by the name/value pair: "service"="library". This allows for several resource servers 104-a, 104-b, 104-c to be identified by a unique name/value pair. For example, "service"="print-service" may identify a resource server that provides printing services, "service"="library-main" may identify the main branch of a library, "service"="cloud-storage" may identify a cloud-based storage service, and so on.

In some embodiments in accordance with the present disclosure, the attributes of a resource 142 may be viewed as resources and may be identified using name/value pairs. For example, an attribute of a book may be its genre: mystery, romance, science, etc. Accordingly, name/value pairs may be defined for each genre; for example, "genre"="mystery", "genre"="romance", "genre"="science", and so on. More generally, any quality or characteristic of a resource may constitute an attribute, and may be identified by a suitable name/value pair. The library example shown in FIG. 2, for instance, defines attributes such as number of pages in a book, whether a book is rare or not, etc.

In some embodiments, name/value pairs may include a relational operator. For example, the name/value pair "pages"<"100" may refer to books having less than 100 pages. A name/value pair may specify an exclusion; e.g., "genre"!="mystery" may refer to books that are not mystery novels.

In some embodiments, resources may be grouped into "resource sets" to identify one or more resources 142 in a resource server 104. For example, a resource set may comprise one or more name/value pairs that identify resources. A resource set may be used to specify a group of resources; for example, the resource set {"service"="library", "rtype"="book", "rtype"="shelf"} refers to the "book" and "shelf" resources in the library. A resource set may comprise a resource with particular attributes; for example, the resource set: {"service"="library", "rtype"="book", "genre"!=("mystery", "sports"), "pages"<"200"} may specify books in a library service that have less than 200 pages and are neither mystery novels nor sports related.

In some embodiments, a resource server 104 may use one or more "service roles," which may be used to control access to its respective resources 142. The resource server 104 may use service roles to enforce actions on or access to its resources 142. Service roles may be defined within the resource server 104. A service role may refer to actual actions that can be performed on the resources 142. The library example shown in FIG. 2, for example, shows several service roles: "read", "checkout", "destroy", "deposit", "remove", and so on. A service role may be associated with or bound to one or more resources. The association or binding between service role and resource may be defined within the resource server 104. In the library example shown in FIG. 2, for example, the "book" resource may be associated with the service roles: "read", "checkout", "checkin", "destroy", and "review"; thus restricting access (e.g., authorized actions) to resources of the type "book".

Turning now to "application scope," in accordance with the present disclosure. An application 106 (FIG. 1) may provide an application scope 162 to the authorization server 102 at some time when interacting with user 12. The application scope 162 may comprise information that represents resources 142 (among one or more resource servers 104) and service roles that an application 106 may be configured to access or otherwise consume (e.g., via a user 12, FIG. 1). The application scope 162 may therefore represent the scope of resources 142 and service roles that can be potentially presented to a user. The application scope 162 may be a subset of all the resources 142 that are available among resource servers 104. For instance, a book-checkout application configured to loan books to library users may be configured (i.e., via its program code) to provide users with limited but sufficient access to the library's resources, such as the "book" and "returnBin" resources and the "read", "checkout", "checkin", and "deposit" service roles. The book-checkout application, however, may omit the "shelf" resource or the "remove" and "destroy" service roles in its program code, since these action are not intended for library users but rather for a librarian.

Reference is made to FIGS. 3A and 3B, to illustrate an example of an application scope 362 in accordance with some embodiments. Consider the configuration of resource servers 304 shown in FIG. 3A. Resource server "srvr-1", for example, manages resources rsrc-11, rsrc-12, rsrc-13, and rsrc-14. It is noted that the notation 'rsrc-11' is shorthand for the name/value pair notation (e.g., "rtype"="book") described above. The actions that resource server "srvr-1" defines on its resources are srole-11, srole-12, and srole-13. Resource server "srvr-2", likewise, manages resources rsrc-21 and rsrc-22, and defines actions srole-21, srole-22, srole-23, srole-24, and srole-25. Resource servers "srvr-3", "srvr-4", and "srvr-5" are similarly defined.

Referring to FIG. 3B, in some embodiments, an application scope 362 may comprise one or more resource sets, each having a corresponding set of service roles. For example, suppose the application scope 362 is provided by a given application. The application scope 362 illustrates that the given application is configured to access some of the resources available among the resource servers shown in FIG. 3A. For example, the given application is configured to use resources from three resource servers: "srvr-1", "srvr-2", and "srvr-5". The given application is further configured to use only resources rsrc-11 and rsrc-13 from resource server "srvr-1", resources rsrc-21, rsrc-22 from resource server srvr-2, and resources rsrc-51 and rsrc-52 from resource server srvr-5. Note that the servers themselves may be expressed as resources in the resource set. The application scope 362 further indicates that the given application is configured to associate service roles (e.g., actions) srole-11 and srole-12 with the listed resources for resource server "srvr-1". Likewise, the given application is configured to associate service roles srole-21, srole-22, and srole-23 with the listed resources for resource server srvr-2, and to associate service roles srole-51 and srole-52 with the listed resources for resource server srvr-5.

As noted above, the application scope 362 represents the scope of resource servers, resources, and service roles that a given application is configured with. In some embodiments, the application may allow a user to access some or all of resource servers, resources, and service roles set forth in the application scope 362. In other embodiments, the application may present to a user only those resource components set forth in the application scope 362 that the user is allowed to access. This aspect of the present disclosure is discussed further.

Turning now to "management roles," as noted above the authorization server 102 may contain management roles 122. A management role 122 in accordance with the present disclosure may bind or associate users with resource sets and services roles. In accordance with the present disclosure, the management role 122 defines the resource servers and resources that a user is allowed to access or otherwise consume.

FIG. 3C shows an illustrative example of a management role 322 named "Admin-manager" in accordance with some embodiments. The management role 322 binds a user John Smith to various resources and service roles to define the resources and service roles that user John Smith can access or otherwise consume. For example, the management role 322 indicates that user John Smith can access resource server "srvr-1", but only resource rsrc-11 on resource server "srvr-1". The management role 322 further illustrates that user John Smith is only authorized to perform the action identified as srole-12 on resource rsrc-11. User John Smith, likewise, is authorized to perform certain actions on certain resources on resource servers "srvr-3" and "srvr-4" as set forth in the management role 322.

Referring for a moment to FIG. 1, management roles 122 may be defined by an administrative user 14 in the authorization server 102. In some embodiments, the resource servers 104 may provide name/value pair definitions for their respective resources 142 to the authorization server 102. The resource servers 104 may define and provide service roles to the authorization server 102, and in some embodiments may also define bindings between service roles and resources 142. The administrative user 14 may define management roles 122 in terms of the resources and service roles provided by the resource servers 104 for individual users 12. In some embodiments, a management role 122 may be bound to a specific users 12. In other embodiments, a management role 122 may be bound to a group of users. For example, the administrative user 14 may define a group of users (e.g., Engineering-Group, East-Coast-Sales-Group, etc.) and bind or otherwise associate the group with resource sets and service role sets.

Figure 4:
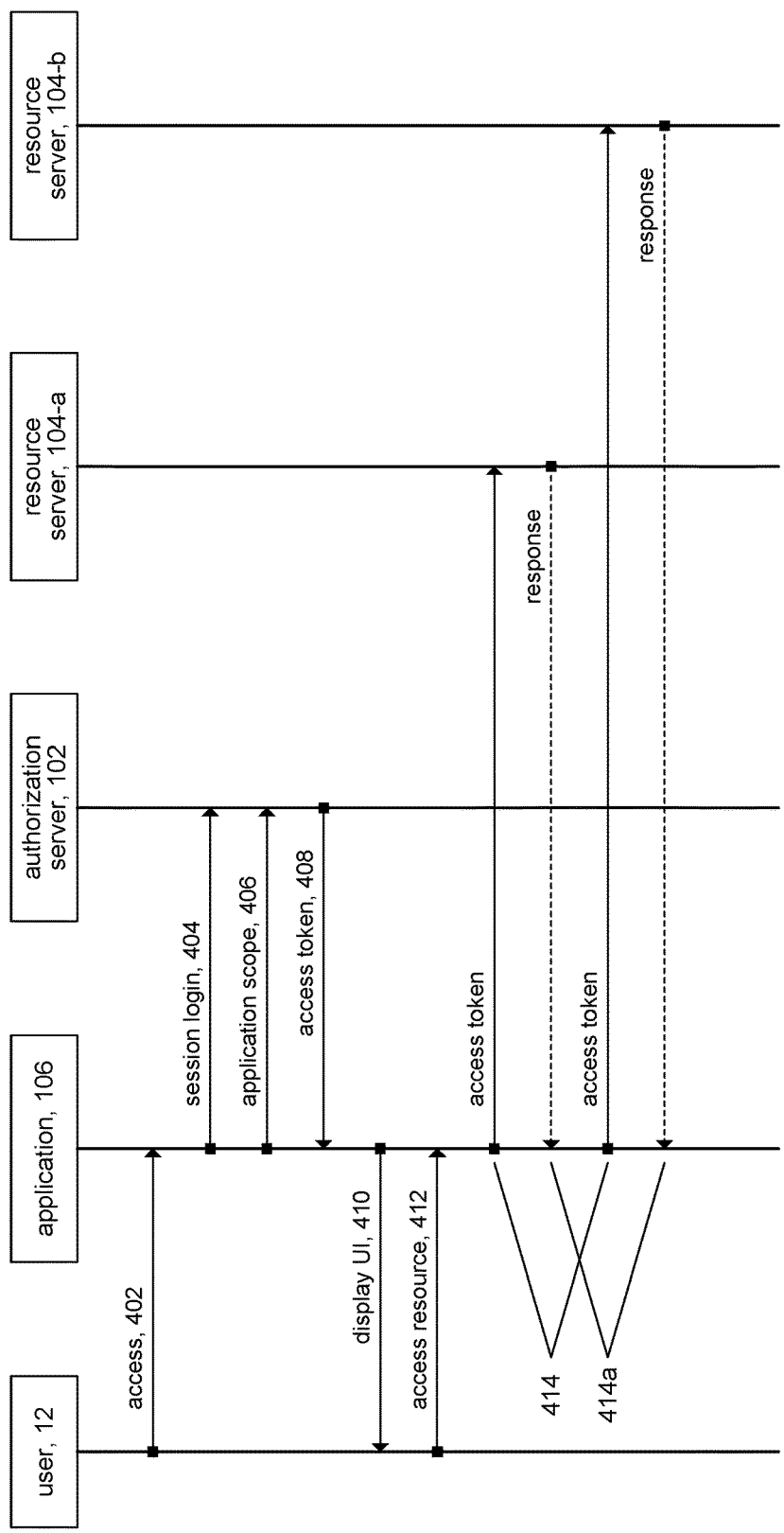
FIG. 4 shows a communication flow in accordance with some embodiments of the present disclosure.

Referring to FIG. 4, the discussion will now turn to a communication flow among the authorization server 102, an application 106, and resource servers 104-a, 104-b in accordance with some embodiments of the present disclosure. The communication flow illustrates activities and data flow between the servers. At flow 402, a user 12 may start an interaction with an application 106. The application 106, for example, may be a web browser, a mobile application, and the like.

At flow 404, the application 106 may initiate and maintain a session with the user 12. In some embodiments, the application 106 may pass control to the authorization server 102 to authenticate the user 12; for example, the authorization server 102 may invoke a login sequence with the user 12. Control may then return to the application 106 to initiate a user session with the now-authenticated user 12.

At flow 406, the application 106 may provide an application scope 162 to the authorization server 102. The application scope 162 may be provided to the authorization server 102 at the same time that it passes control to the authorization server 102 to authenticate the user 12. As explained above, the application scope 162 may represent the set of (one or more) resource servers 104-a, 104-b, their respective resources and service roles (e.g., actions) on those resources that the application 106 is configured for. The following example may provide a useful context.

Consider, for instance, a photo printing service. The resource server 104-a (FIG. 1) may be a photographic print server, and the application 106 may be a printing application that is configured to allow users to access the photographic print server. The photographic print server may provide resources such as different sizes of paper stock, different paper finishes (e.g., glossy, matte, etc.), printing service (e.g., print, delete print job, etc.), and so on. The application scope 162 would represent all the resources and service roles that the printing application is configured to access; for example, the application scope 162 might include paper resources for all paper sizes and finishes for all finishes supported by the photographic print server. The application scope 162 might include services roles such as print, delete a print job.

At flow 408, the authorization server 102 may return an access token 124 to the application 106. In accordance with the present disclosure, the authorization server 102 may use the identity of the user 12 and the application scope 162 to extract or otherwise generate a subset of the application scope 162 as the access token 124. The access token 124 may represent only those resource servers, resources, and service roles in the application scope 162 that the user 12 is authorized to access. Stated differently, the access token 124 may represent resource servers and respective resources that the user is authorized to access or otherwise consume via the printing application. These aspects of the present disclosure are discussed in more detail below. In the printer service example above, for instance, User-1 may only be able to print on 4×5 stock and may select from matte finish or glossy finish. Accordingly, the access token 124 for User-1 would include paper resources for only 4×5 stock with matte finish or glossy finish, and include the service role for printing. User-2 may be able to print on any size paper but only with matte finish, and may be allowed to delete their print jobs. Accordingly, the access token 124 for User-2 would include paper resources for any paper size, but only for matte finish, and include the service roles for printing and deleting print jobs.

At flow 410, the application 106 may display a user interface (UI, not shown) to interact with the user 12 during their session. In some embodiments, the UI may present only those resource servers and resources that the user 12 is authorized to access using the application 106; for example, using the access token 124. The application 106 can therefore provide a UI that is personalized for each user 12 dependent upon the scope of their authority to access the resource servers and resources. Using the printer service example above, for instance, the UI for User-1 may include a selection graphic (e.g., drop-down menu, list, etc.) that allows the user to select a matte finish or glossy finish. The UI, however, may simply indicate to User-1 that they can only print on 4×5 stock; in other words, the UI may omit any options for printing on other stock sizes. The UI for User-2 may include a selection graphic that allows the user to select from among the paper sizes that are available at the photographic print server; the UI, however, may indicate to User-2 that they can only print on matte finish.

At flow 412, the user 12 may interact with their personalized UI to access one or more resources that the application 106 makes available to them.

At flow 414, the application 106 may communicate with one or more of the resource servers 104-a, 104-b to access the resource(s) requested by the user 12; e.g., using API calls to the resource servers 104-a. 104-b. The API calls may include respective access tokens 164 (FIG. 1) that identify the resources being accessed in the respective resource servers. The access token 164 in an API call to a given resource server, for example, may contain resources and service roles (obtained from the access token 124 received from the authorization service) specific to that resource server.

At flow 414a, the resource servers 104-a, 104-b may respond to the application 106. The response may indicate that the resource access was successful or not. Depending on the nature of the resource, the response may include the accessed resource itself; for example, the resource may be data such as user information, an electronic document, and the like.

Figure 5:
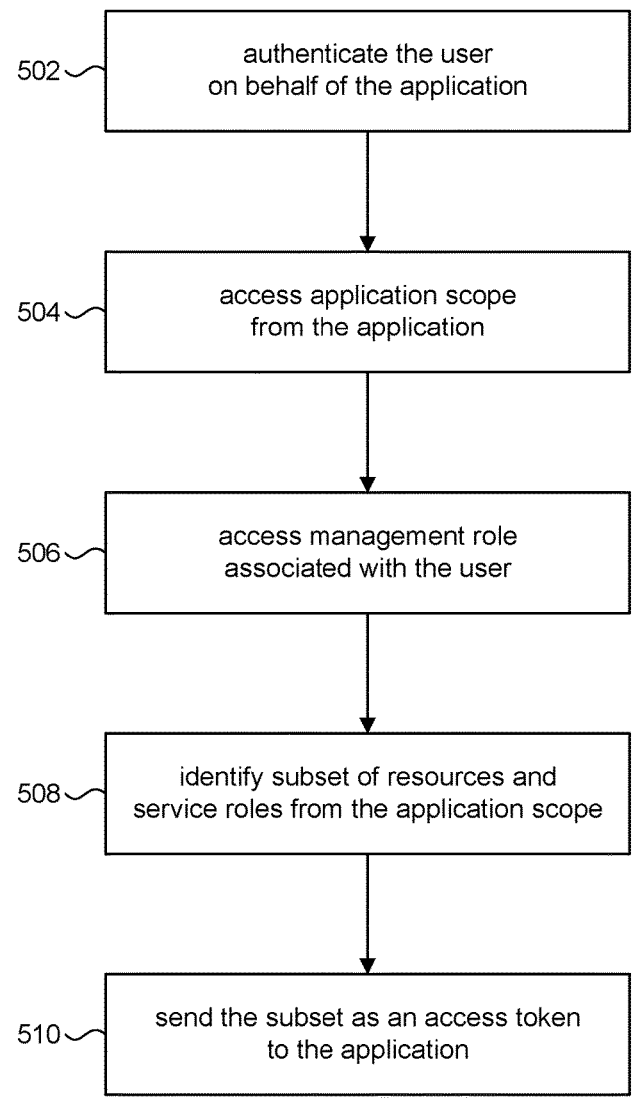
FIG. 5 shows a process flow in accordance with some embodiments of the present disclosure.

Referring to FIG. 5, the discussion will now turn to a high level description of some heuristics that can serve to represent processing in the authorization server 102 to produce access tokens 124 in accordance with the present disclosure. In some embodiments, for example, the authorization server 102 may include computer executable program code, which when executed by a computer system (e.g., 702, FIG. 7), may cause the computer system to perform processing in accordance with FIG. 5.

At block 502, the authorization server 102 may authenticate a user (e.g., 12, FIG. 1). As explained above, for example, in some embodiments authentication control may be passed from the application 106 to the authorization server 102; e.g., via a session login request from the application 106 to the authentication server 102. The authentication may come in the form of a login sequence, for example, performed by the authentication server 102.

At block 504, the authorization server 102 may access the application scope 162 (FIG. 1) provided by the application 106. As explained above, the application scope 162 sets forth the set of resource servers, resources, and service roles that the application 106 is configured to access. In some embodiments, for example, the application 106 may include the application scope 162 in the session login request (block 502).

At block 506, the authorization server 102 may access a management role 122 (FIG. 1) that corresponds to or is otherwise associated with the authenticated user 12. As explained above, the management role 122 sets forth the set of resource servers, resources, and service roles that a given user is authorized to access.

At block 508, the authorization server 102 may extract or otherwise identify a subset of the application scope 162 using the management role 122 associated with the user. The resulting subset represents resource servers, resources, and service roles that the user 12 is authorized to access with respect to the resource servers, resources, and service roles that the application 106 is configured to access. This aspect of the present disclosure is discussed in more detail below with reference to FIG. 6.

At block 510, the authorization server 102 may send the extracted subset of the application scope 162 as an access token 124 (FIG. 1) to the application 106.

Figure 6:
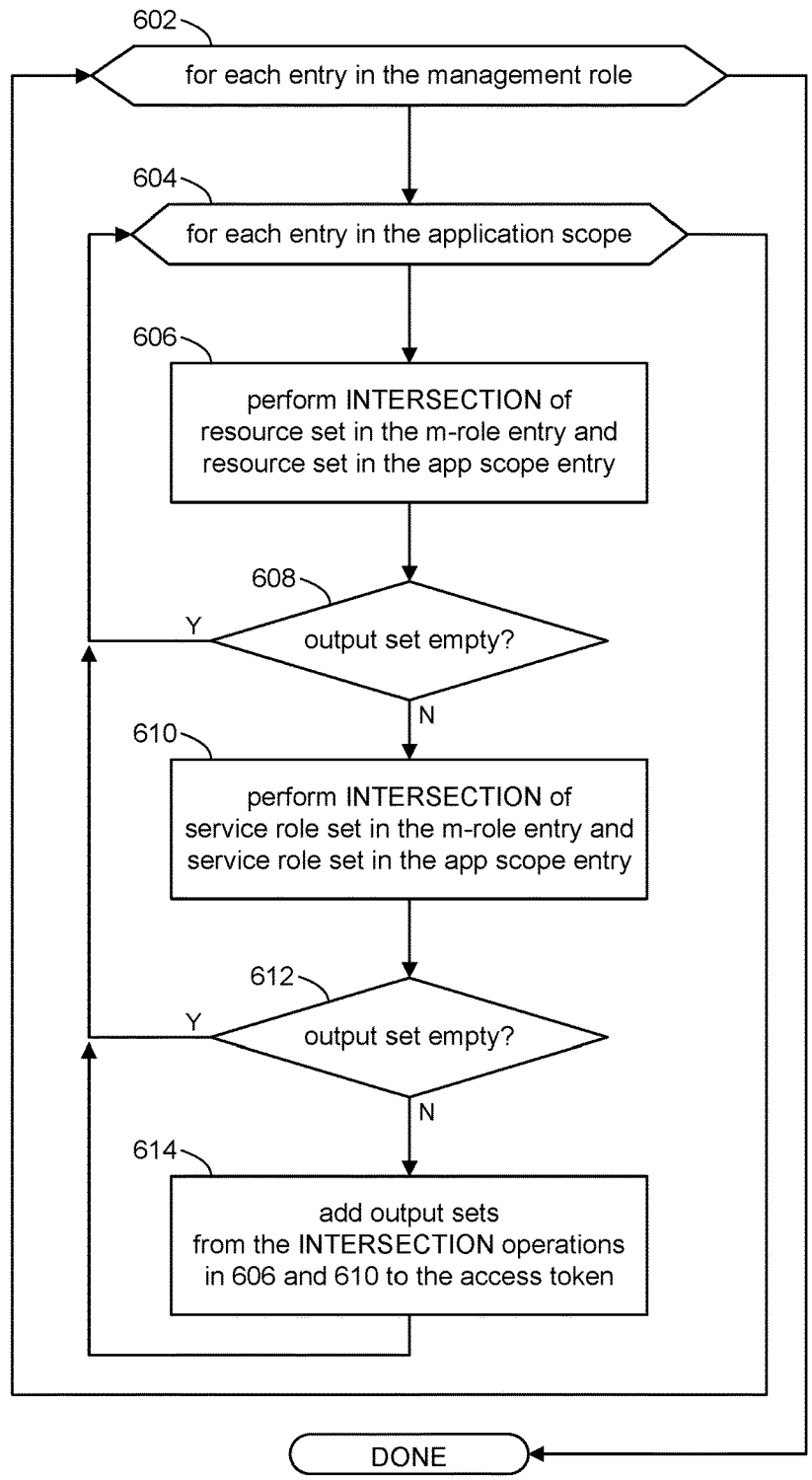

Referring to FIGS. 6 and 6A, the discussion will now turn to a high level description of some heuristics that can serve to represent processing in the authorization server 102 to produce an access token using the application scope and management role in accordance with the present disclosure. In some embodiments, for example, the authorization server 102 may include computer executable program code, which when executed by a computer system (e.g., 702, FIG. 7), may cause the computer system to perform the processing in accordance with FIG. 6.

An illustrative example is provided in FIG. 6A, showing an example of a management role 622 associated with an authenticated user (e.g., John Smith) and an example of an application scope 662 (of a given application, not shown). The management role 622 comprises entries 622a, 622b, 622c. Each entry 622a-622c comprises a resource set bound or otherwise associated with a service role set. The application scope 662 comprises entries 662a, 662b, 662c. Each entry 662a-662c, in turn, comprises a resource set bound or otherwise associated with a service role set.

Referring to FIG. 6, at block 602, the authorization server 102 may process (m-role) each entry 622a-622c in the management role 622 relative to entries 662a-662c the application scope 662, as shown in the figure. Conversely, in some embodiments, the authorization server 102 may instead process each entry 662a-662c in the application scope 662 relative to entries 622a-622c in the management role 622.

At block 604, the authorization server 102 may process each (app scope) entry 662a-662c in the application scope 662 for a given m-role entry from the management role 622.

At block 606, the authorization server 102 may perform an INTERSECTION set operation between the resource set of the given m-role entry and the resource set of a given app scope entry. In some embodiments, resources in a resource set may not necessarily be in any particular order. Accordingly, in some embodiments, each resource (expressed as a name/value pair) in one resource set (e.g., of the m-role entry) may be compared with each resource in the other resource set (e.g., in the app scope entry) to determine a match. In particular, the name/value pair of a resource in one resource set may be AND'd with the name/value pairs of the resources in the other resource set; if a match between the name and a match between the value occurs, then that name/value pair will be placed in an output set of the INTERSECTION operation. Consider, for example, the resource sets of the m-role entry 622a and the app scope entry 662a. It can be seen that the INTERSECTION operation between these two resource sets would produce the resulting output set {"service"="print-service", "queue"="matte"}; the resource "service"="print-service"" and the resource "queue"="matte" are common to both the m-role entry and the 622a app scope entry 662a. The resource "queue"="glossy" is not common to both the m-role entry and the 622a app scope entry 662a, and so is omitted from the output set.

At block 608, if the INTERSECTION operation of block 606 results in an empty output set, then none of the resources in the resource set of the given app scope entry matched any of the resources in the resource set of the given m-role entry. Processing in the authorization server 102 may return to block 604 (Y branch) to process the next entry in the application scope. If, on the other hand, the output set is not empty (i.e., contains at least one common resource), then processing in the authorization server 102 may proceed to block 610 (N branch).

At block 610, the authorization server 102 may perform an INTERSECTION operation between the service role set of the given m-role entry and the service role set of a given app scope entry. Service roles in a service role set are not necessarily in any particular order. Accordingly, in some embodiments, each service role in one service role set may be compared with each service role in the other service role set to find a match. In particular, a service role in one service role set may be AND'd with the service roles in the other service role set. If a match occurs, then that service role will be placed in an output set of the INTERSECTION operation. Consider, for example, the service role sets of the m-role entry 622a and the app scope entry 662a. It can be seen that the INTERSECTION operation between these two resource sets would produce the resulting output set {"print"}; the service role "print" is common to both the m-role entry 622a and the app scope entry 662a. The service role "delete print job" is not common to both the m-role entry 622a and the app scope entry 662a, and so is omitted from the output set.

At block 612, if the INTERSECTION operation of block 610 results in an empty output set, then none of the service roles in the service role set of the given app scope entry matched any of the service roles in the service role set of the given m-role entry. Processing in the authorization server 102 may return to block 604 (Y branch) to process the next entry in the application scope. Thus, even if there were some resource matches in block 610, an empty output set from the processing in block 612 means user John Smith is not authorized to perform any actions, so no further processing is needed. If, on the other hand, the output set is not empty (i.e., contains at least one common service role), then processing in the authorization server 102 may proceed to block 614 (N branch).

At block 614, the authorization server 102 has an output set from the INTERSECTION operation of the resource sets of the given app scope entry and the given m-role entry, and an output set from the INTERSECTION operation of the service role sets. This means that user John Smith is authorized with respect to at least on resource and with respect to one action. Accordingly, the authorization server 102 may associate or otherwise bind these two output sets with each other and add them to as an entry 624a, 624b in an access token 624.

Returning to block 604, after all the entries in the application scope 662 have been processed for the given m-role entry, processing in the authorization server 102 may return to block 602 to process the next m-role entry in the management role 622 for user John Smith. Processing completes when the authorization server 102 has processed all entries 622a-622c in the management role 622.

At this point, the resulting access token 624 represents only those resource servers, resources, and service roles in the given application that the user (e.g., John Smith) is authorized to access. For example, while the given application can provide a user access to resource server "srvr-5", user John Smith is not authorized to access that resource server. Moreover, while user John Smith has access to resource server "srvr-3", the user can only access resources rsrc-31 and rsrc-33 on that resource server, even the given application is configured to provide access to resource rsrc-32.

The entries 624a, 624b of access token 624 shown in FIG. 6A, may represent a subset of a complete access token. In various embodiments, the access token 624 may include other fields, such as but no limited to: an identifier of the access token, an identifier of the user's session, a user identifier, and so on.

Figure 7:
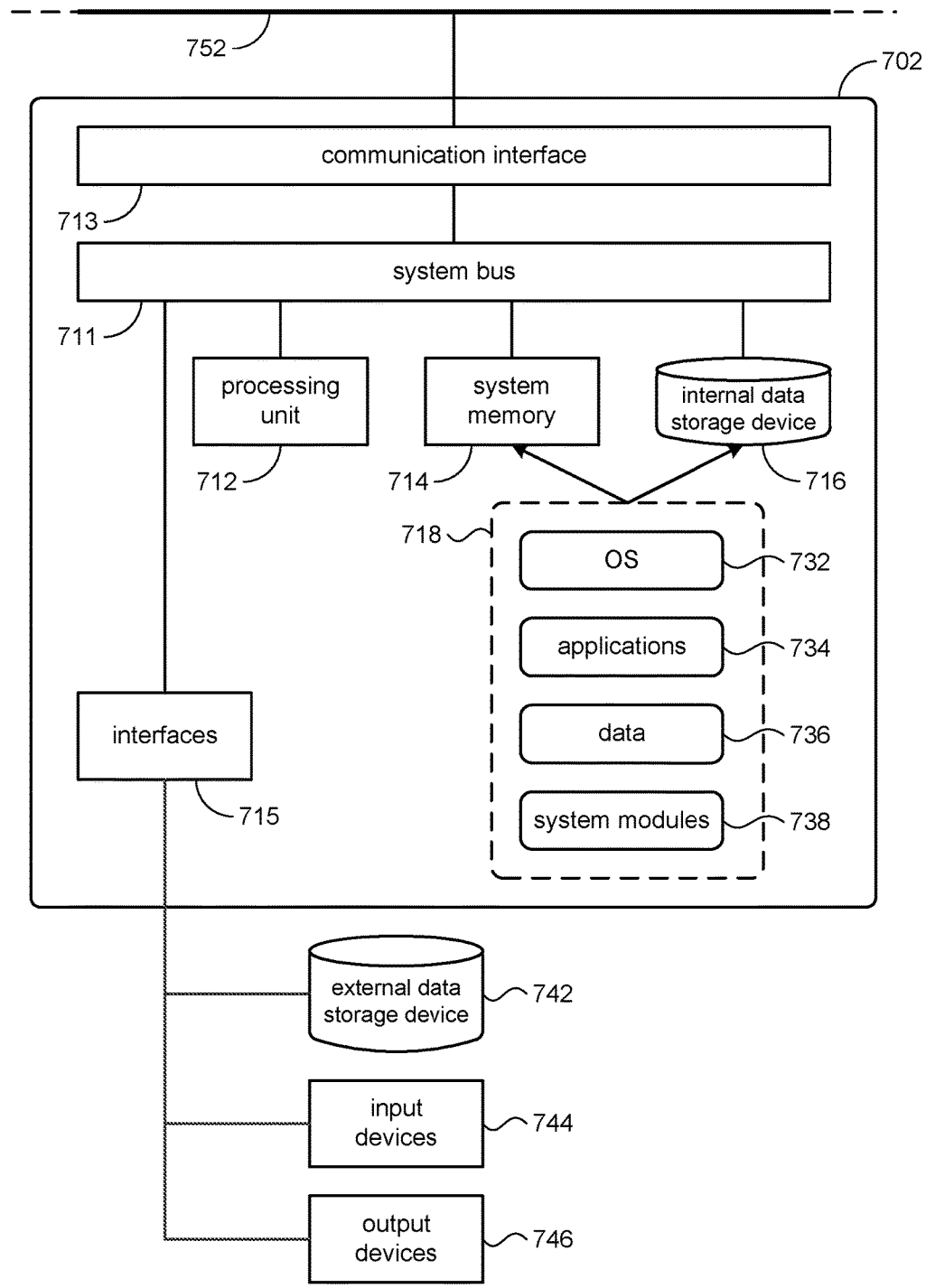
FIG. 7 is a high level block diagram of a computer system configured in accordance with some embodiments of the present disclosure.

Referring to FIG. 7, an illustrative implementation of an authorization server (e.g., 102, FIG. 1) in accordance with the present disclosure may include a computer system 702 having a processing unit 712, a system memory 714, and a system bus 711. The system bus 711 may connect various system components including, but not limited to, the processing unit 712, the system memory 714, an internal data storage device 716, and a communication interface 713.

The processing unit 712 may comprise a single-processor configuration, or may be a multi-processor architecture. The system memory 714 may include read-only memory (ROM) and random access memory (RAM). The internal data storage device 716 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 716 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 714 and/or the internal data storage device 716 may store various program and data modules 718, including for example, operating system 732, one or more application programs 734, program data 736, and other program/system modules 738. For example, the application programs 734, which when executed, may cause the computer system 702 to perform method steps of FIGS. 5 and 6.

An external data storage device 742 may be connected to the computer system 702. For example, the external data storage device 742 may serve as a data store for management roles 122 (FIG. 1).

The computer system 702 may operate in a networked environment using logical connections via wired and/or wireless communications to one or more remote computers (e.g. resource servers 104, FIG. 1) over a communication network 752. The communication network 752 may be a local area network (LAN) and/or larger networks, such as a wide area network (WAN).

Direct access to the computer system 702 may be provided by a suitable input device 744 (e.g., keyboard, mouse, touch pad, etc.) and a suitable output device 746, (e.g., display screen) connected to the computer system 702. In some embodiments, access may be made remotely, for example, over a communication network.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method for granting a user access to one or more resources managed by one or more resource servers, the method comprising:
   authenticating a user of an application that is configured to access one or more resources;
   accessing an application scope associated with the application, the application scope comprising information that identifies the one or more resources of the application and at least one resource server that manages the one or more resources;
   accessing at least one management role associated with the user, the management role comprising information that identifies a plurality of resource servers and one or more resources respectively managed by the plurality of resource servers that the user is authorized to access;
   using the application scope and the management role to identify authorized resources and authorized resource servers, wherein the authorized resources are resources identified in both the application scope and the management role, wherein the authorized resource servers are resource servers identified in both the application scope and the management role; and
   sending an access token to the application, the access token comprising the identified authorized resource and authorized resource server.

2. The method of claim 1, further comprising receiving the application scope from the application.

3. The method of claim 1, wherein the management role associated with the user further comprises information that identifies one or more service roles associated with each of the one or more resources respectively managed by the plurality of resource servers, wherein each service role is associated with one or more actions, wherein the application scope further comprises information that identifies one or more service roles supported by the at least one resource server, wherein identifying one or more resources and respective resource servers in the management role further includes using the application scope to identify one or more service roles in the management role, wherein the access token further comprises the identified one or more actions.

4. The method of claim 3, wherein a service role refers to an explicit action.

5. The method of claim 1, wherein the application presents a user interface to the user that includes the authorized resource servers and authorized resources identified in the access token.

6. The method of claim 1, wherein the application accesses the identified one or more resources from a respective resource server using the authorized resources and authorized resource servers identified in the access token.

7. The method of claim 1, wherein each resource is represented as a name/value pair, wherein the name represents a type of resource and the value represents an instance of a given type of resource,
wherein the application scope comprises one or more name/value pairs,
wherein the management role comprises a plurality of name/value pairs,
wherein using the application scope and the management role to identify authorized resources and authorized resource servers includes matching name/value pairs in the application scope with name/value pairs in the management role.

8. The method of claim 7, wherein the application scope further comprises one or more service roles, wherein the management role further comprises one or more service roles associated with each name/value pair, wherein using the application scope and the management role to identify authorized resources and authorized resource servers further includes matching service roles in the application scope with service roles in the management role.

9. A non-transitory computer-readable storage medium having stored thereon computer executable instructions, which when executed by a computer device, cause the computer device to:
authenticate a user of an application that is configured to access one or more resources;
access an application scope associated with the application, the application scope comprising information that identifies the one or more resources of the application and at least one resource server that manages the one or more resources;
access at least one management role associated with the user, the management role comprising information that identifies a plurality of resource servers and one or more resources respectively managed by the plurality of resource servers that the user is authorized to access;
use the application scope and the management role to identify authorized resources and authorized resource servers, wherein the authorized resources are resources identified in both the application scope and the management role, wherein the authorized resource servers are resource servers identified in both the application scope and the management role; and
send an access token to the application, the access token comprising the identified authorized resource and authorized resource server.

10. The non-transitory computer-readable storage medium of claim 9, wherein the computer executable instructions, which when executed by a computer device, further cause the computer device to receive the application scope from the application.

11. The non-transitory computer-readable storage medium of claim 9, wherein the management role associated with the user further comprises information that identifies one or more service roles associated with each of the one or more resources respectively managed by the plurality of resource servers, wherein each service role is associated with one or more actions, wherein the application scope further comprises information that identifies one or more service roles supported by the at least one resource server, wherein the one or more resources and respective resource servers in the management role are identified using the application scope to identify one or more service roles in the management role, wherein the access token further comprises the identified one or more actions.

12. The non-transitory computer-readable storage medium of claim 11, wherein a service role refers to an explicit action.

13. The non-transitory computer-readable storage medium of claim 9, wherein the application presents a user interface to the user that that includes the authorized resource servers and authorized resources identified in the access token.

14. The non-transitory computer-readable storage medium of claim 9, wherein the application accesses the identified one or more resources from a respective resource server using the authorized resources and authorized resource servers identified in the access token.

15. The non-transitory computer-readable storage medium of claim 9, wherein each resource is represented as a name/value pair, wherein the name represents a type of resource and the value represents an instance of a given type of resource,
wherein the application scope comprises one or more name/value pairs,
wherein the management role comprises a plurality of name/value pairs,
wherein the authorized resources and authorized resource servers are identified by matching name/value pairs in the application scope with name/value pairs in the management role.

16. The non-transitory computer-readable storage medium of claim 15, wherein the application scope further comprises one or more service roles, wherein the management role further comprises one or more service roles associated with each name/value pair, wherein authorized resources and authorized resource servers are further identified by matching service roles in the application scope with service roles in the management role.

17. A computer system comprising:
one or more computer processors; and
a computer-readable storage medium comprising instructions for controlling the one or more computer processors to be operable to:
authenticate a user of an application that is configured to access one or more resources;
access an application scope associated with the application, the application scope comprising information that identifies the one or more resources of the application and at least one resource server that manages the one or more resources;
access at least one management role associated with the user, the management role comprising information that identifies a plurality of resource servers and one or more resources respectively managed by the plurality of resource servers that the user is authorized to access;
use the application scope and the management role to identify authorized resources and authorized resource servers, wherein the authorized resources are resources identified in both the application scope and the management role, wherein the authorized resource servers are resource servers identified in both the application scope and the management role; and send an access token to the application, the access token comprising the identified authorized resource and authorized resource server.

18. The computer system of claim 17, wherein the management role associated with the user further comprises information that identifies one or more service roles associated with each of the one or more resources respectively managed by the plurality of resource servers, wherein each service role is associated with one or more actions, wherein the application scope further comprises information that identifies one or more service roles supported by the at least one resource server, wherein the one or more resources and respective resource servers in the management role are identified using the application scope to identify one or more service roles in the management role, wherein the access token further comprises the identified one or more actions.

19. The computer system of claim 17, wherein the application presents a user interface to the user that includes the authorized resource servers and authorized resources identified in the access token.

20. The computer system of claim 17, wherein each resource is represented as a name/value pair, wherein the name represents a type of resource and the value represents an instance of a given type of resource,
- wherein the application scope comprises one or more name/value pairs,
- wherein the management role comprises a plurality of name/value pairs,
- wherein the authorized resources and authorized resource servers are identified by matching name/value pairs in the application scope with name/value pairs in the management role.

* * * * *